Oct. 11, 1927.
J. H. SHERTS
1,645,355
MOTOR VEHICLE AND WINDOW THEREFOR
Filed May 27, 1925
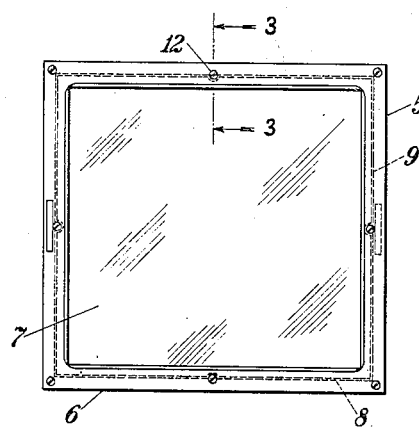
Fig. 1
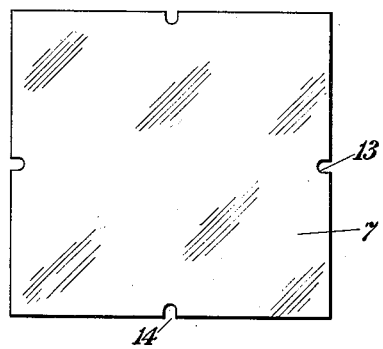
Fig. 2
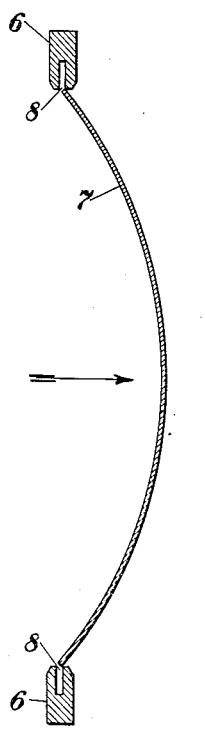
Fig. 4
Fig. 3
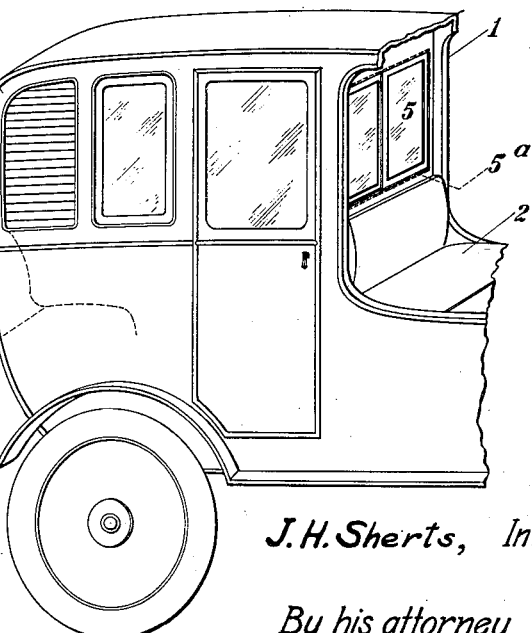
Fig. 5
J. H. Sherts, Inventor
By his attorney
J. R. Squair.

Patented Oct. 11, 1927.

1,645,355

UNITED STATES PATENT OFFICE.

JAMES HERVEY SHERTS, OF NEWARK, NEW JERSEY, ASSIGNOR TO E. I. DU PONT DE NEMOURS & COMPANY, OF WILMINGTON, DELAWARE, A CORPORATION OF DELAWARE.

MOTOR VEHICLE AND WINDOW THEREFOR.

Application filed May 27, 1925. Serial No. 33,083.

This invention relates to motor vehicles and windows therefor, and more particularly it relates to passenger vehicles and to safety windows for the protection of the passenger in case of sudden stopping or slowing down of the vehicle because of accident or for other reason. The invention has especially advantageous application to taxicabs, and like vehicles, in which the passenger sits behind a window such as the crosswise partition window in rear of the driver's seat of a taxicab. Without restriction of the invention thereto it is, for the sake of definiteness, described with particular reference to taxicabs.

The passenger in a taxicab of the usual type is constantly liable to injury from a cause to which he gives but little thought, but which is well recognized by those having supervision of the operation of fleets of these vehicles. This injury is the cutting of the head and face, or the very severe bumping thereof, by the front windows. It is caused by the head of the passenger striking the window when the cab slows down suddenly. In the ordinary closed car with a partition between the driver and the rear seat passengers, such as the enclosed drive limousine, there is a very considerable distance between the passengers and the window, so that if the car slows down or stops suddenly, and the passengers are thrown forward, they may recover themselves, or be thrown to the floor, before striking the window; but this is not true of cars of the cab type. In these, the enclosure is very short, so as to give a short wheel base, with the result that the passenger is brought so close to the window that when he is thrown forward he strikes his face or head thereon. An apparent way to overcome this danger would be to provide a glass window so stiff and strong that it would resist the blow, for instance use heavy plate or wire glass; but this does not solve the problem. Although the glass may not break and thus cut the passenger's head, it presents a firm, hard, unyielding barrier capable of giving very serious injury when the head strikes it. I have devised a vehicle, and a window therefor, such that injuries of the type indicated are practically eliminated. It is the major object of the invention to provide such a vehicle and window. To this end and also to improve generally upon devices of the character indicated, the invention consists in the various matters hereinafter described and claimed.

Without restricting the invention thereto, the invention is described with particular reference to the embodiment thereof shown in the accompanying drawings. In these drawings:—Figure 1 is a face view of the window; Figure 2 is a face view of the pane removed from the sash; Figure 3 is an enlarged cross-sectional view taken substantially on line 3—3 of Figure 1; Figure 4 is a cross-sectional view, somewhat conventional and diagrammatic in character, illustrating the action of the pane under a sufficiently sever blow; and Figure 5 is a fragmental, simplified, perspective view of a taxicab with a window therein in accordance with the invention.

In general, the invention comprises a pane which, while fully satisfactory for enclosure, vision, and protection purposes, is not only non-breakable but is also yieldable under a blow. It is indeed of such a yieldability, and that yieldability or ability to blow under a pressure, is so mated with the structure for holding the pane in the sash, that upon a sufficiently severe blow the pane will be removed from the sash; but without damage to the pane or sash. With this construction, when the cab stops suddenly and the passenger strikes his head against the pane, or (as sometimes occurs) strikes his hand against the pane in subconsciously fending himself, not only is there no breakage of the pane and consequent cuts but furthermore the pane yields, easing the blow and rendering it substantially harmless, and in extreme cases first serves to cushion the blow and then moves out of the way so that the head or hand merely passes through the sash without injury. Referring now to the drawings, the construction may be in detail as follows:—

The cab, designated generally as 1, comprises the front or driver's seat 2 and the passengers' seat 3, the latter being housed in the cab body 4. The front of the cab body is provided with one or more windows 5 in accordance with the invention, and permanently mounted in any suitable manner in the body frame (as distinguished from a weather curtain window), as in slide groove 5ª. A window 5 comprises the sash 6 and the pane 7. The sash 6 may be of wood or any appropriate material. The pane 7, however, is of a material having particular characteristics, and is so mated with the sash, as to give the advantages above indicated.

Thus, in particular accordance with the invention, the pane is of transparent, flexible, practically unbreakable material. Preferably it is of cellulose ester plastic, for example pyroxylin plastic, of such type as to give the desired qualities, as explained hereinafter. The sash 6 is provided with a groove 8 in which the pane is received. The pane is of such size relative to the overall size of the sash and the depth of the groove, (that is, the pane extends to such depth in the groove), and the pane is of such bendability, that when the pane is bent to a considerable extent, but yet not beyond its elastic limit, the pane will leave the groove and sash (Figure 4). For example, with a pane of pyroxylin plastic of the general type indicated below, about a foot and one-half square and about sixty-thousandths of an inch thick, I have found that it is satisfactory to have the pane project into the groove about nine-sixteenths inch, this giving the pane a good hold in the frame, while permitting it to yield and cushion an ordinary blow without actually leaving the frame, and providing for its leaving the frame under a very heavy blow.

Pyroxylin plastic of the character desired may be prepared as follows, it being understood that the general procedure of making pyroxylin plastic is well-known:—Pyroxylin is colloided with a suitable plasticizer, as camphor and alcohol, by mixing in a kneading machine, suitable proportions being (parts by weight) pyroxylin 75, camphor 23, alcohol 20; the plastic is then rolled until the residual solvent (alcohol) is reduced to about 15%; then the plastic is pressed into cakes and these cakes cut into sheets of proper thickness; and finally, the sheets are seasoned in a suitable drying room until the residual solvent is reduced to about 2%. To finish the panes, the sheets are press polished and cut to size.

The thickness of the pane is such as to give a substantial strength to the pane against wind pressure and so on, and give it a degree of rigidity, not inconsistent with the purpose of having it yield, and cushion a blow. Generally speaking, the pane is of a very substantial thickness compared with that of usual plastic sheets (.015 to .02 inch), the thickness desirably increasing in approximate accordance with increase in over-all area. For example, I have found the following satisfactory:—

| Area of pane (square feet). | Thickness of plastic (inch). |
|---|---|
| 2 | .040 to .060 |
| 4 | .060 to .080 |
| 6 | .080 to .100 |

In further conformity with the invention, the pane is so mounted in the sash that the pane is sufficiently held to eliminate undue looseness and rattle but yet is retained in such manner that it may contract under temperature changes, and expand thereunder without butting the frame and bulging. To this end, the pane is somewhat smaller in over-all dimensions than the area demarked by the bottom 9 of the groove 8, as indicated in Figures 1 and 3, and the clearance 10 so provided is made ample to permit without obstruction any expansion of the pane. As a practical matter, about one-sixteenth inch clearance all around is generally satisfactory; that is, with a groove five-eighths inch deep, with the pane in central position it may project nine-sixteenths inch into the groove all around.

Furthermore, the pane is not tightly grasped by the sides 11 of the groove but is merely lightly held, thus there may be, say, one-thousandth inch play. Also, the frame may be provided with adjusting screws 12 for adjusting, within small limits depending upon the flexibility of the material, the distance between the sides of the groove. It is to be noted that although these screws lie somewhat within the margin lines of the pane the screws themselves do not prevent, or in any way interfere with, the movements of the pane. This result is accomplished by the notches 13 in the edges of the pane which clear the screws all about and are open at the outer end as indicated at 14. The clearance between the head 15 of a notch and the mating screw 12 should, of course, be at least as great as the clearance between the edge of the pane and the bottom of the groove 7 if full advantage of the latter clearance is to be assured. It will be understood that the notch is somewhat wider than the screw to allow for any changes of width of the notch, or changes in the distance between notches where two or more are used on a side, due to expansion and contraction, without interference by the screw. A notch three-eighths inch wide mating with a screw of about three-sixteenths inch diameter is generally satisfactory. As a guide in determining desirable clearances it is noted that the coefficient of expansion of plastic such as that described is about .000141 in the temperature range 20 to 50° C.

For placing the pane in the sash, the sash may if desired be built about the pane;

but, conveniently the sash may be completely built up and then the pane bowed enough so that it can be slipped into the sash, the pane then flattening itself due to its resiliency and the edges of the pane seating themselves in the receiving groove.

As illustrating the practical characteristics of a window embodying the invention, it is noted that under test a window of the present type was uneffected by a two and three-quarters pound weight dropped from a height of six feet; with a weight of eight and one-quarter pounds dropped from a height of about three feet, the pane merely resiliently yielded somewhat under the blow, and with this same weight dropped from a height of forty-four inches the pane left the frame. In no case was the pane in any way harmed, and merely sustained a few slight surface scratches. The contrast to glass is obvious, but it may be stated that under similar tests on wire glass when the two and three-fourth-pound weight was dropped but fourteen inches onto a pane covered with a quadruple thickness of cloth, the glass was cracked and shattered in several directions; and when the weight was dropped from a height of eighteen inches it broke completely through the pane.

While particular reference has been made to cellulose nitrate plastic, it will be understood that the plastics of other cellulose esters, for example cellulose acetate, may be used. Also, while reference has been made to adjusting means, as the screws 12, it will be understood that in certain windows, as those of small size or in which there is no danger of the frame warping, such a means may be dispensed with.

Relative to the pane containing about 2% residual solvent, it will be understood that the solvent, either as the stock is manufactured, or afterwards, due to slight drying out in time, may be somewhat less than this without materially effecting the flexibility of the pane for present purposes.

I claim:

1. In a passenger vehicle body having a permanent window in such position that it may be struck by a passenger upon sudden slowing of the vehicle, a thick cellulosic plastic pane loosely mounted in the rigid frame of said window and resiliently yieldable under impact, whereby the passenger will be protected from injury due to striking the pane.

2. In a motor vehicle window, a sash provided with a pane-receiving groove, and a pane of cellulose ester plastic, of substantial thickness and resiliently yieldable under impact, said pane extending at all its edges into said groove to be held thereby, and the yieldability of said pane and the depth that said pane extends into said groove being mated to provide that the pane will bow and slip from the groove substantially prior to the reaching of the breaking strength of said pane.

In testimony whereof I affix my signature.

JAMES HERVEY SHERTS.